Nov. 7, 1967  J. SCHINDLING  3,350,852
MULTI-CELL CENTRIFUGAL DUST SEPARATOR
Filed July 27, 1965  2 Sheets-Sheet 1
INVENTOR
JOSEF SCHINDLING
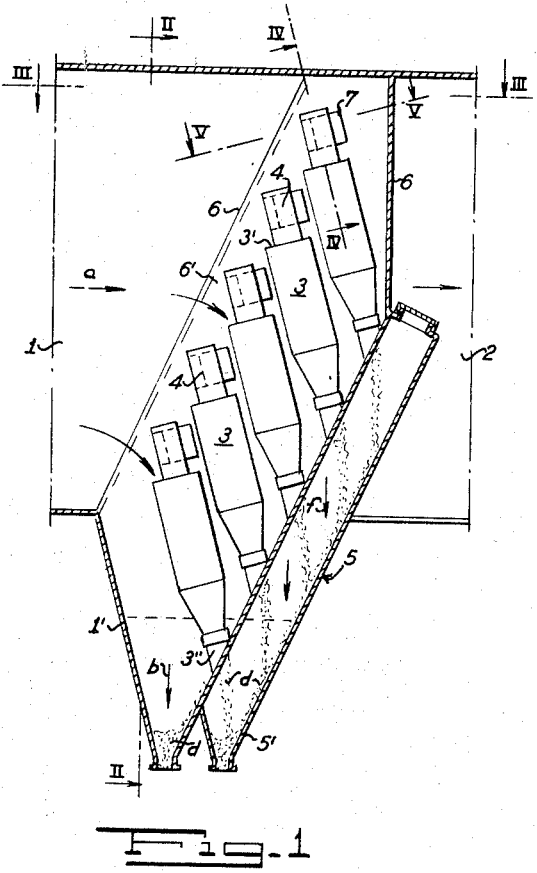
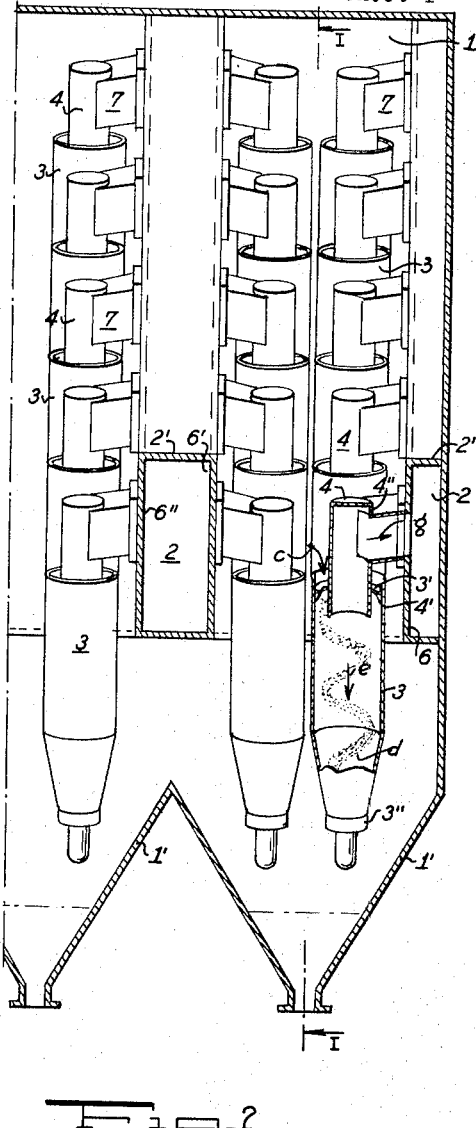
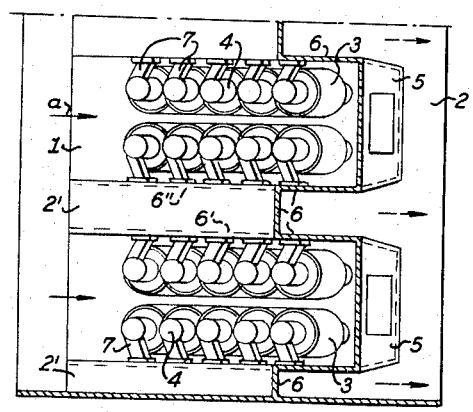

INVENTOR
JOSEF SCHINDLING

United States Patent Office 3,350,852
Patented Nov. 7, 1967

3,350,852
MULTI-CELL CENTRIFUGAL DUST SEPARATOR
Josef Schindling, Frankfurt am Main, Germany, assignor to Metallgesellschaft Aktiengesellschaft, Frankfurt am Main, Germany, a corporation of Germany
Filed July 27, 1965, Ser. No. 475,136
Claims priority, application Germany, Aug. 4, 1964, M 61,974
6 Claims. (Cl. 55—348)

ABSTRACT OF THE DISCLOSURE

Multi-cell centrifugal dust separator having a plurality of aligned upstanding centrifugal separator dust tubes flow communicating with a raw gas feed chamber at their upper ends and with a dust collection chamber at their lower ends, corresponding centrifugal separator purified gas tubes of smaller diameter than that of the dust tubes situated with their lower ends in partial telescoping alignment with the dust tube upper ends and their upper portions extending upwardly beyond the dust tube upper ends and being closed at their tops, corresponding outlet conduits generally radially outwardly extending from the gas tube upper portions and flow communicating said gas tubes with a purified gas recovery chamber through corresponding apertures in a partition which at least partially separates the feed and recovery chambers, all three chambers being sealed from direct flow communication therebetween, retaining means for removably attaching the gas tubes via said outlet conduits to the partition at said apertures, including pairs of angle bar retaining tracks on the lateral sides of the apertures and flanges on the outlet conduits interposed between the partition and the tracks, sealing means interposed between the partition margins at the apertures and the flanges and wedge means removably inserted between the tracks and flanges to secure sealing contact between the outlet conduits and partition margins at the apertures via the sealing material interposed therebetween.

---

The present invention relates to multi-cell centrifugal dust separators, and more particularly to a multi-cell centrifugal dust separator containing a plurality of aligned centrifugal separator means communicating with a raw gas feed chamber via an inlet means and communicating separately with a dust collector chamber via dust outlet means and with a purified gas recovery chamber via purified gas outlet means and outlet conduits, such that the outlet conduits span a relatively short distance between the separator means and the adjacent wall portion of the purified gas recovery chamber, whereby to minimize dust accumulation and reduce manufacturing costs in the dust separator arrangement.

It is known to arrange separating cells of multiple centrifugal dust separators in tandem on slanting dust collecting tubes, for example, as shown in German Patent No. 949,507. It is also known, according to U.S. Patent No. 3,074,219, in connection with separating cells arranged on slanting dust collecting tubes, to provide the purified gas tubes of the separating cells with angled outlet connections which are elongated so as to conduct the purified gas from the purified gas tubes into the cross sectional space present between the dust collecting tubes to the purified gas recovery chamber located behind such dust collecting tubes. The elongated outlet connections, however, give rise to undesirable dust accumulations therealong which detract from the efficiency of the separation arrangement.

It is an object of the present invention to overcome the foregoing disadvantage and to provide a multi-cell centrifugal dust separator containing a plurality of aligned centrifugal separator means communicating with a raw gas feed chamber via an inlet means and communicating separately with a dust collector chamber via dust outlet means and with a purified gas recovery chamber via purified gas outlet means and outlet conduits, such that the outlet conduits span a relatively short distance between the separator means and the adjacent wall portion of the purified gas recovery chamber.

It is a further object of the present invention to utilize a separator construction which minimizes dust accumulations in the flow path extending from the purified gas outlet to the purified gas receevery chamber and to provide such a construction entailing a minimum of cost yet making possible an extremely efficient dust separation operation.

Other and further objects of the present invention will become apparent from a study of the within specification and accompanying drawings in which:

FIG. 1 is a schematic longitudinal partial sectional view taken along the line I—I of FIG. 2, illustrating the positional arrangement of the centrifugal dust separating means, the raw gas feed chamber, the dust collector chamber, and the purified gas recovery chamber, in accordance with the present invention;

FIG. 2 is a schematic view partially in section of a portion of the apparatus of FIG. 1 taken along the line II—II of FIG. 1;

FIG. 3 is a schematic top view, partially in section, showing a portion of the arrangement of FIG. 1 as taken along the line III—III of FIG. 1;

Figure 4:
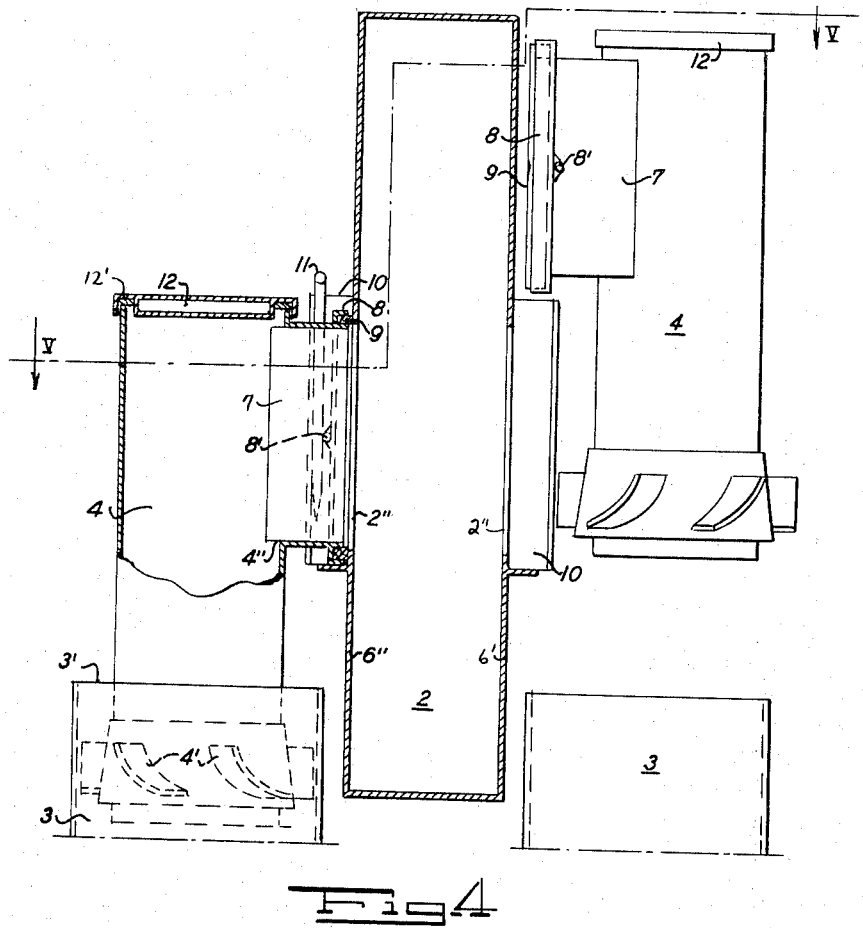
Figure 5:
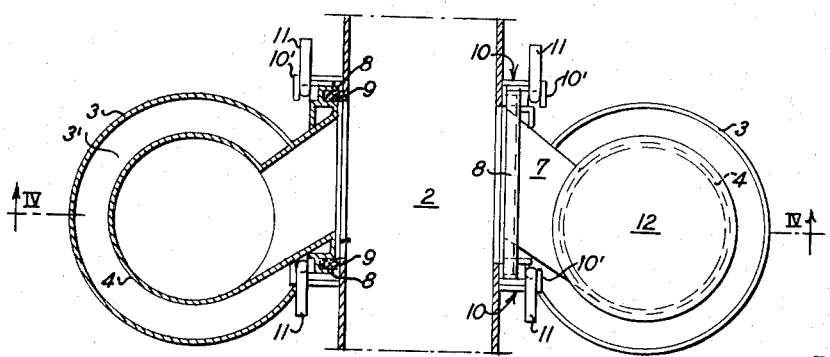

FIG. 4 is a schematic enlarged partial view showing details of construction of purified gas separator tubes in relation to the adjacent wall portions of the purified gas recovery chamber, taken along the line IV—IV of FIG. 1, and more specifically along the line IV—IV of FIG. 5, and FIG. 5 is a schematic enlarged top view partially in section, showing the arrangement of the separator means, outlet conduits and adjacent wall portions of the chamber in accordance with the invention, taken along the line V—V of FIG. 1, and more specifically along the line V—V of FIG. 4.

It has been found in accordance with the present invention that a multi-cell centrifugal dust separator may be provided which is efficient in operation and relatively inexpensive in construction, and which in particular minimizes dust accumulations in the flow path from the purified gas outlet from the separator means to the purified gas recovery chamber, such centrifugal dust separator comprising a raw gas feed chamber, a purified gas recovery chamber adjacent said feed chamber, a dust collector chamber, all said chambers being sealed off from direct flow communication therebetween, a plurality of aligned centrifugal separator means each having inlet means flow communicating with said feed chamber, each having dust outlet means flow communicating with said collector chamber and each having purified gas outlet means flow communicating with a corresponding plurality of outlet conduits, said feed and recovery chambers being separated at least in part by a partition interposed therebetween having a wall portion which extends closely along all said separator means and closely adjacent said purified gas outlet means, said outlet conduits flow communicating correspondingly said purified gas outlet means with said recovery chamber through said wall portion. Significantly, the outlet conduits are all substantially of the same flow length and, in turn, the corresponding wall portion of the recovery chamber partition is equidistant from the aligned centrifugal separator means.

In accordance with a specific embodiment of the present invention, a plurality of rows of aligned centrifugal separator means is provided, each row having a corresponding wall portion of said partition extending closely along all of the separator means thereof and closely adjacent the corresponding purified gas outlet means thereof, corresponding outlet conduits therefor which are all of substantially the same flow length flow communicating the respective purified gas outlet means with said recovery chamber through said corresponding wall portion. Preferably, each row of aligned separator means is inclined upwardly from said feed chamber toward said recovery chamber and the corresponding wall portion therefor is similarly inclined with respect to the longitudinal axis thereof extending closely along the respective separator means.

For greater efficiency in operation, the outlet conduits are tangentially flow connected with said purified gas outlet means to achieve tangential flow off of purified gas from said purified gas outlet means into said outlet conduits. Specifically, such outlet conduits outwardly diverge in flow cross section in the direction from said purified gas outlet means toward said wall portion.

In connection with the specific construction of the separator means contemplated, each such separator means includes a lower centrifugal separator tube and an upper purified gas tube having a smaller diameter than that of said separator tube and being in partial telescoping relation with said separator tube such that the lower end of said purified gas tube extends downwardly into the upper end of said separator tube to provide therewith an annular channel forming the corresponding inlet means flow communicating the particular separator means with said feed chamber, the lower end of said separator tube flow communicating via the corresponding dust outlet means with said collector chamber, the upper end of said purified gas tube being closed and the upper portion of said tube containing the corresponding purified gas outlet means which flow communicates said purified gas tube with the corresponding outlet conduit and in turn said recovery chamber through the corresponding wall portion. Advantageously, the lower end of the purified gas tube in question is provided with means extending into said annular channel for imparting a centrifugal flow to the gas entering said separator tube from said feed chamber. Such means for imparting a centrifugal flow includes arcuate flights extending into said annular channel. The flow direction of the flights of the respective separator means of one row preferably alternates with respect to the flow direction of the separator means of the next row for more efficient gas flow through the system.

In accordance with an advantageous feature of the present invention, each purified gas tube and the corresponding outlet conduit therefor is removably attached to the corresponding wall portion. Also, the upper end of each purified gas tube is closed via a removable lid normally maintained in sealing contact with the upper end of the purified gas tube. The corresponding wall portion is provided advantageously with means defining an aperture adjacent each of the separator means for flow communicating the corresponding outlet conduit with the recovery chamber. In connection therewith, retaining means are provided for removably attaching the adjacent portion of the corresponding outlet conduit to the wall portion in alignment with the particular aperture means. Such retaining means may include a pair of angle bar retaining tracks adjacent the lateral sides of the corresponding aperture means while the adjacent portion of the corresponding outlet conduit is provided with lateral flange means for cooperative removable retaining engagement with the tracks whereby to attach the corresponding purified gas tube and outlet conduit to the wall portion in alignment with the particular aperture means thereat. For best efficiency of operation, a peripheral sealing material is provided around the marginal area of each aperture means and removable wedge means are inserted between the tracks and flange means to secure sealing contact between the adjacent portion of the corresponding outlet conduit and the corresponding aperture means of the wall portion via the sealing material interposed therebetween.

The purified gas tubes and separator tubes are suitably maintained in concentric axial alignment and the respective axes are inclined upwardly in a direction longitudinally toward the feed chamber and away from the recovery chamber adjacent thereto. The rows of separator means in question are conveniently spaced apart in parallel relation and are inclined upwardly in a direction longitudinally away from the feed chamber and toward the recovery chamber. A common duct defining an extended portion of the recovery chamber and having side walls serving as the wall portions closely adjacent the purified gas outlet means is situated longitudinally between a particular pair of rows of separator means whereby to serve for the recovery of the purified gas from the separator means in an efficient manner due to the extremely short flow length of the outlet conduits which flow communicate the separator means with such common duct.

Referring to the drawings, gas to be treated for the removal of dust contained therein is conducted in the direction of arrows $a$ (FIGS. 1 and 3) into the raw gas feed chamber 1 where such gas enters the annular space or inlet means 3' between the upper purified gas tubes 4 and the lower centrifugal separator tubes 3. A certain amount of dust is lost by the gas in raw gas feed chamber 1, such dust $d$ descending in the direction of arrow $b$ into the hopper 1' at the bottom of feed chamber 1. As may be seen in FIG. 2 for instance, the incoming gas flowing in the direction of arrow $c$ is caused to assume a spiral path by reason of the presence of the arcuate flights 4' disposed in the annular gap 3', whereupon the dust present in the gas is centrifugally outwardly directed and caused to be separated from the gas for collection in common dust chute or dust collector chamber 5 upon passing through the dust outlet means 3" at the lower end of the particular separator tube 3. The dust $d$ passes in the direction of the arrow $e$ spirally downwardly through dust outlet means 3" and thence in the direction of arrows $f$ (see FIG. 1) to the bottom of the hopper 5' of the dust collector chamber 5.

As may be further seen in FIG. 2, the purified gas flows axially upwardly into the bottom end of purified gas tube 4 in the direction of the arrows $g$ and thence through the purified gas outlet means 4" and in turn through the relatively short outlet conduit 7.

Advantageously, in accordance with the present invention, the partition 6 between the raw gas feed chamber 1 and the purified gas recovery chamber 2 defines along appropriate portions thereof duct extensions 2' which occupy the cross sectional space within raw gas feed chamber 1 between adjacent aligned rows of the separator means including tubes 3 and 4. Therefore, the common duct 2' represents a forward extension of purified gas recovery chamber 2 into the raw gas feed chamber 1 sufficient to provide adjacent wall portions 6' and 6" as close as possible to the respective purified gas tubes 4. This permits extremely short outlet conduits 7 to be utilized, whereupon dust accumulations will be avoided in such outlet conduits and the purified gas will flow into such ducts 2' and accordingly reach the purified gas recovery chamber 2 with a minimum of travel through flow passages which might be prone to dust accumulations and concomitant clogging under the operations contemplated.

As may be appreciated from FIG. 3, the partition 6 actually represents an interposed wall between the raw gas feed chamber 1 and the purified gas recovery chamber 2 along a zig-zag course permitting compact design to be employed in a centrifugal dust separator of the type contemplated, for achieving the use of a minimum of space for the system and a reduction in manufacturing costs, as well as a more efficient operation without dust accumulation in the outlet conduits from the separator means to the very closely adjacent purified gas recovery chamber portion defined by the common ducts 2'. This is true inasmuch as the rows of separator means may be inclined upwardly in a longitudinal direction from the feed chamber 1 to the recovery chamber 2 with the respective rows of separator means being as closely situated to one another as possible and with pairs of rows being accommodated by a common purified recovery chamber duct 2'.

As may be seen from FIGS. 4 and 5, the purified gas tube 4 extends downwardly such that its lower end is in telescopic alignment concentrically within the upper end of the corresponding lower centrifugal separator tube 3. The inlet means or annular gap 3' is shown as containing the arcuate flights 4' carried at the bottom end portion of upper purified gas tube 4. As the gas enters the annular gap 3', the same is conveyed in a spiral direction by means of the flights 4' whereupon the centrifugal separation of the heavier dust particles with respect to the gas is achieved. Since the diameter of the lower tube 3 is larger than that of the upper tube 4, the annual gap 3' provides a suitable inlet into the separator means and permits the desired spiral flow to be imparted to the incoming raw gas. The gas, being the lighter of the components of the mixture, i.e., gas and dust particles, is axially directed so that the same will travel upwardly through tube 4 to the purified gas outlet means 4" at the upper end portion of tube 4 while the dust, the density of which is about two thousand times greater than that of the gas, is directed to the wall of the collecting tube 3 by the centrifugal force. Such gas will thence pass through the outlet conduit 7 having an extremely short flow length, in consequence of which no dust accumulations will occur in such outlet conduit. A removable lid or cover 12 is disposed on the top end of tube 4, such lid being provided preferably with an asbestos seal 12' to prevent raw gas from entering into the clean gas tube 4 without having passed through the collecting tubes 3. The lid 12 is so constructed that the same will maintain sealing contact with the top of tube 4 merely because of the weight of the lid itself. The upper tube 4, including the outlet conduit 7, is advantageously designed to permit ready removal thereof from within the upper end of lower tube 3 and away from flow connection with the purified gas recovery space 2, as exemplified by the common duct 2'.

Of course, upon removal of the tube 4 and outlet conduit 7, inspection of the parts, and if necessary cleaning thereof, may be accomplished with a minimum of trouble and manipulation. No screws, bolts or other usual fastening means are employed. The same is true regarding the lid 12 which may be removed readily for inspection or for cleaning purposes.

The actual connection of the outlet conduit to the wall portion 6' or 6" of the common duct 2' is achieved in a simple manner and with a minimum of constructional details. Because of the removable nature of outlet conduit 7, the same is provided with a peripheral frame 8 containing an asbestos packing material or the like on the contact surface of such frame for sealing engagement with the marginal surface surrounding the appropriate aperture 2" defined in the particular wall portion 6' or 6" of the common duct 2. In order to achieve the removable attachment of the adjacent portion of outlet conduit 7 with the wall portion 6' or 6" of common duct 2' in alignment with the corresponding aperture means 2", retaining means in the form of angle bar retaining tracks 10 are provided which contain a medially directed flange 10' forming a retaining guide for the appropriate lateral portions of frame 8. Upon sliding frame 8 within the retaining tracks 10, a suitable wedge, for example in the form of a wedge-shaped pin 11, may be inserted downwardly between the inner wall of flange 10' and the outer wall or flange of frame 8 to secure the asbestos packing material 9 of frame 8 in sealing contact with the marginal surface surrounding the particular aperture means 2". If desired, a projection 8' may be situated at either lateral side of frame 8 secured to the outward flange represented by that portion of frame 8 to permit the particular pin 11 to achieve wedging contact between the flange 10' of the track 10 and the appropriate flange portion of the frame 8.

Most importantly, to achieve uniform flow of the purified gas through the outlet conduit 7, such conduit is positioned with respect to the upper tube 4 in a manner that the discharge of gas from tube 4 is tangential. Moreover, outlet conduit 7 is flared or provided with outwardly diverging lateral walls in the direction toward the common duct 2' to accomplish a decrease in velocity of the gas in the manner of a diffuser.

Accordingly, the present invention provides an improvement in or simplification of the construction of a multiple centrifugal dust separator of the type heretofore known in the art, whereby instead of comparatively long extensive ducts flow communicating the outlet conduits or angled purified gas connections with the purified gas recovery chamber, as provided heretofore in the prior art, the side walls of the dust collecting tubes are elongated in accordance with the present invention toward the raw gas input side of the system and closed at the top whereby the purified gas chamber is made to extend in the cross sectional space between the aligned rows of separating cells. Significantly, in accordance with the present invention, a multi-cell centrifugal dust separator is provided which possesses means for reversal of the gas direction, using centrifugal flow imparting means such as stationary fins or arcuate flights, whereby the desired rotational flow of the dust laden gas will be produced in the separating tubes which are disposed in tandem on dust collecting tubes. In turn, the purified gas may then be conducted into the elongated portion of the purified gas recovery chamber extending into the cross section situated between the dust collecting tubes of the appropriate rows of aligned separator means. The side walls of the dust collecting tubes are conveniently elongated toward the raw gas side of the arrangement, whereupon the purified gas recovery chamber is able to extend between the aligned rows of separator cells. The partition which separates the purified gas recovery chamber from the raw gas feed chamber is thus constructed in a zig-zag shape, as may be seen for example in FIG. 3.

A further feature of the present invention contemplates the more or less direct connection of the out flow of the separator cells with the side walls of the purified gas recovery chamber which extend between the rows of separator cells. As aforesaid, the angled outlet connections may be widened in the manner of a diffuser so that the gas exiting from the purified gas tubes of the separator cells may flow in a uniform manner and with a decrease in velocity into the recovery chamber.

By the provision for asbestos packing material or seals, or the like, at the extremities of the outlet connections or outlet conduit, the connections of the purified gas tubes with the adjacent wall portion of the recovery chamber may be readily accomplished such that the sealing bed of asbestos material will be pushed against the marginal surface of the appropriate aperture means as the upper purified gas tube is pushed downwardly into the upper end of the lower separator tube with the outlet conduit frame cooperatively engaged between the appropriate retaining tracks on the common duct wall portion. The use of tapered pins to achieve a good seal between the asbestos packing and such marginal portions renders the removal and re-insertion of the upper tubes simple, and the same is true regarding the removal of the covers closing off the upper ends of the purified gas tubes, which covers effect a desired seal with the upper end of the upper tubes by reason of the weight of such covers and the provision for an asbestos packing at the underside thereof.

The multi-cell centrifugal dust separator arrangement thus possesses many advantages over dust separator arrangements heretofore known. Due to the comparatively short outlet connections or outlet conduits on the tubes, undesirable dust accumulations are avoided and accordingly manufacturing costs are reduced since the previously utilized prolonged outlet connections between the purified gas tubes and the recovery chamber are eliminated in favor of an extension of the recovery chamber into a space formerly occupied by such elongated outlet connections.

Indeed, the side walls of the purified gas chamber common duct extending between the aligned separator cells are used in conjunction with the dust collector tubes for the removal of the purified gas and the dust from the separator cells.

Obviously, the particular mounting of the purified gas tubes according to the persent invention permits an easier installation and removal of such tubes simply by lifting them axially out, without the need for loosening screws or other fastening means.

The asbestos packing or seal utilized for the outer ends of the tangential outlet connections or outlet conduits, i.e. at the peripheral frame, is advantageously affixed to the purified gas tube portion for installation and removal therewith. Such packing is not broken up or required to be repacked with each removal, as is true with conventional seals such as stuffing box-type seals. The packing means of the present invention thus assure a rapid replacement of worn out parts, and simpler cleaning of such parts is rendered possible.

Since no substantial accumulations of dust will occur in the multi-cell or multi-clone centrifugal dust separator of the present invention, the arrangement in question may be used advantageously for treating explosive and perishable dusts without the usual problems arising. The interchangeability of the constructional elements is preserved whereas in accordance with previous constructions interchange is not possible among the various elements in question, such as the purified gas tubes, etc.

Accordingly, each separator cell may be inspected individually from above by merely removing the covers on the upper purifier gas tubes or by removing such tubes in the simple manner discussed. In the event dusts which have a tendency to form incrustations are separated from gases in the arrangement in question, dust deposits can be completely removed in an extremely simple and efficient manner with a directed stream of water. Since the covers and/or the purified gas tubes are readily removed, and since the rows of aligned separator means are inclined toward the raw gas feed chamber (see FIG. 1), ready inspection and ready accessibility for cleaning may be enjoyed.

It will be seen in accordance with the foregoing that the present invention represents a simplification of the construction of a multiple centrifugal dust separator such as that disclosed in U.S. Patent No. 3,074,219, in that instead of the extensive passages 58 and 58' of the angled purified gas outlet conduit connections 56 as provided therein, the side walls of the dust collector tubes or chamber subsections are, according to the present invention, elongated toward the raw gas inlet side of the feed chamber and closed off at the top, so that the purified gas recovery chamber extends forwardly to a point between the separator cells, with the partition interposed between the purified gas recovery chamber and the raw gas feed chamber having a zig-zag shape, as can be seen clearly from FIG. 3.

Because of the presence of a rotational flow of the gas being purified in the lower tubes 3, which rotational flow also exists in the upper tubes 4, the angled outlet conduits 7 may be connected tangentially to the purified gas tubes 4 and widened or flared in the direction toward the corresponding wall portion of the partition 6, in the manner of a diffuser having diverging walls, the pressure loss of the separator cells thus being reduced. Furthermore, by changing the direction of rotation of the gases being treated in the separator cells, from row to row, a good injection of the purified gas into the purified gas recovery chamber portion closely adjacent thereto is achieved, i.e., along the common ducts 2'. Naturally, any dust accumulation which might possibly occur in the common ducts 2 will be of minor significance considering the over-all operations involved, and because of the comparatively large flow volume and flow cross section of such common ducts with respect to the comparatively narrow flow cross section and short flow path of the respective outlet conduits, a larger quantity of deposited dust may be accommodated in the common duct as opposed to the individual outlet conduits or elongated outlet conduits as found in the prior art system (cf. U.S. Patent No. 3,074,219) without adverse effects on the efficiency of the arrangement.

It will be appreciated that the instant specification and drawings are set forth by way of illustration and not limitation, and that various modifications and changes may be made without departing from the spirit and scope of the present invention which is to be limited only by the scope of the appended claims.

What is claimed is:

1. In a multi-cell centrifugal dust separator having a raw gas feed chamber, a purified gas recovery chamber adjacent said feed chamber, a dust collector chamber at least partially below said feed chamber, all said chambers being sealed off from direct flow communication therebetween and said feed and recovery chambers being separated at least in part by a partition interposed therebetween which is provided with means defining a plurality of separate apertures therethrough, a corresponding plurality of centrifugal separator means each including a lower centrifugal separator dust tube and an upper purified gas tube, each said gas tube possessing a smaller diameter than that of the corresponding dust tube and being in substantially vertical partial telescoping relation therewith such that the lower end of said gas tube extends downwardly into the upper end of said dust tube sufficiently to define an annular inlet means thereat, said inlet means flow communicating the particular separator means with said feed chamber, a corresponding dust outlet means flow communicating the lower end of each said dust tube with said collector chamber, the upper end of each said gas tube being closed, a corresponding gas outlet means defined radially through the upper portion of each said gas tube, and a corresponding generally radially outwardly arranged gas outlet conduit interposed between each said gas outlet means and a corresponding aperture means of said partition and flow communicating said gas tube with said recovery chamber through said partition, whereby raw gas passing through said feed chamber enters said separator means through said inlet means and dust centrifugally separated therein passes via said dust outlet means to said collector chamber while resulting purified gas free from such dust passes via said gas outlet means through the corresponding gas outlet conduit and aperture means to said recovery chamber, the improvement which comprises corresponding retaining means removably attaching each said gas tube and the corresponding gas outlet conduit therefor in the form of a composite arrangement to the corresponding portion of said partition at the particular aperture means, each said retaining means including a pair of substantially vertical angle bar retaining tracks positioned on said partition adjacent the lateral sides of the particular aperture means and coperating flange means provided on the adjacent peripheral portion of the corresponding gas outlet conduit for removable retaining engagement with said tracks to attach the corresponding gas tube and gas outlet conduit to said partition in alignment with the particular aperture means thereat such that corresponding lateral portions of said flange means are interposed between said partition and said angle bar retaining tracks, peripheral sealing means being interposed between the marginal area of the particular aperture means on said partition and the peripheral portion of the corresponding gas outlet conduit, and removable wedge means operatively substantially downwardly inserted between each said angle bar retaining track and each such flange means corresponding lateral portion to secure sealing contact between the corresponding gas outlet conduit peripheral portion and aperture means marginal area via said sealing material interposed therebetween.

2. Improvement according to claim 1 wherein each said gas outlet conduit is tangentially flow connected with the corresponding gas tube at the particular gas outlet means and outwardly diverges in flow cross section in a direction from said gas outlet means to the corresponding aperture means to achieve tangential flow of purified gas from said gas outlet means into said gas outlet conduit and uniform flow with reduced pressure loss therethrough to said aperture means, and wherein the lower end of each said gas tube is provided with means including arcuate flights extending into said annular inlet means for imparting centrifugal flow to the gas entering said separator means from said feed chamber.

3. Improvement according to claim 2 wherein the upper end of each said gas tube is closed via a removable lid normally maintained by virtue of the weight thereof in sealing contact with the upper end of said gas tube.

4. Improvement according to claim 3 wherein said gas outlet conduits are all of substantially the same flow length, wherein a plurality of rows of aligned centrifugal separator means is provided, each row having a corresponding wall portion of said partition extending closely along all of the separator means thereof and closely adjacent the corresponding gas outlet means thereof, each such row of aligned separator means being inclined upwardly substantially in a longitudinal direction from said feed chamber toward said recovery chamber and the corresponding wall portion of said partition being similarly inclined with respect to the longitudinal axis thereof extending closely along the respective separator means, and wherein the flow direction of the flights of the respective separator means of one row alternates with respect to that of the separator means of the next row.

5. Improvement according to claim 4 wherein said gas tubes and dust tubes are in corresponding concentric axial alignment and the respective axes are inclined upwardly in a direction longitudinally toward said feed chamber and away from said recovery chamber adjacent thereto, said rows being spaced apart in parallel relation and inclined upwardly in a direction longitudinally away from said feed chamber and toward said recovery chamber, a pair of said rows being provided longitudinally with a common duct therebetween defining an extended portion of said recovery chamber and having side walls forming said corresponding wall portions of said partition closely adjacent the corresponding gas outlet means.

6. Improvement according to claim 1 wherein the surfaces of the lateral portions of said flange means remote from said sealing means and said aperture means and adjacent said angle bar retaining tracks are provided correspondingly with projections to permit the particular wedge means to achieve positive wedging contact between such projections and the adjacent portions of said angle bar retaining tracks thereat.

References Cited

UNITED STATES PATENTS

| | | | |
|---|---|---|---|
| 2,268,170 | 12/1941 | Schmidt | 55—344 |
| 2,632,527 | 3/1953 | McBride | 55—344 |
| 2,870,863 | 1/1959 | Bramhall | 55—376 |
| 2,962,115 | 11/1960 | Schmid | 55—107 |
| 2,995,207 | 8/1961 | Brandt | 55—348 |
| 3,074,219 | 1/1963 | Phyl et al. | 55—348 |
| 3,085,382 | 4/1963 | Finney et al. | 55—449 |

FOREIGN PATENTS

| | | |
|---|---|---|
| 1,291,869 | 3/1962 | France. |
| 618,210 | 2/1949 | Great Britain. |

HARRY B. THORNTON, *Primary Examiner.*

B. NOZICK, *Assistant Examiner.*